United States Patent
Adis et al.

(10) Patent No.: US 7,255,352 B2
(45) Date of Patent: Aug. 14, 2007

(54) PRESSURE BALANCED BRUSH SEAL

(75) Inventors: William Edward Adis, Scotia, NY (US); Bernard Arthur Couture, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/237,976

(22) Filed: Sep. 29, 2005

(65) Prior Publication Data

US 2007/0069475 A1 Mar. 29, 2007

(51) Int. Cl.
*F16J 15/44* (2006.01)

(52) U.S. Cl. .................................................. 277/355
(58) Field of Classification Search ................. 277/355
See application file for complete search history.

(56) References Cited

U.S. PATENT DOCUMENTS

| | | | |
|---|---|---|---|
| 5,318,309 A | | 6/1994 | Tseng et al. |
| 5,401,036 A | * | 3/1995 | Basu ........................... 277/355 |
| 5,474,306 A | | 12/1995 | Bagepalli et al. |
| 5,799,952 A | | 9/1998 | Morrison et al. |
| 5,961,279 A | | 10/1999 | Ingistov |
| 6,027,121 A | | 2/2000 | Cromer et al. |
| 6,226,975 B1 | | 5/2001 | Ingistov |
| 6,286,211 B1 | | 9/2001 | Turnquist et al. |
| 6,382,632 B1 | | 5/2002 | Chupp et al. |
| 6,406,027 B1 | | 6/2002 | Aksit et al. |
| 6,431,827 B1 | | 8/2002 | Wolfe et al. |
| 6,457,719 B1 | * | 10/2002 | Fellenstein et al. ......... 277/355 |
| 6,460,857 B1 | | 10/2002 | Turnquist et al. |
| 6,499,742 B1 | | 12/2002 | Zhou et al. |
| 6,505,835 B2 | | 1/2003 | Tong et al. |
| 6,840,518 B2 | * | 1/2005 | Boston ........................ 277/355 |
| 2006/0210392 A1 | * | 9/2006 | Enderby ................... 415/170.1 |
| 2006/0214378 A1 | * | 9/2006 | Zheng ......................... 277/355 |

OTHER PUBLICATIONS

Couture et al., U.S. Appl. No. 11/237,824, entitled: A Method of Manufacturing a Brush Seal for Sealing Between Stationary and Rotary Components, filed Sep. 29, 2005.

* cited by examiner

*Primary Examiner*—Vishal Patel
(74) *Attorney, Agent, or Firm*—Nixon & Vanderhye, PC

(57) ABSTRACT

A brush seal extends between static and rotary components. The brush seal includes a fence on the high pressure side, a bristle pack behind the fence, a bristle pack backing plate and a pressure plate. The backing plate includes a plurality of circumferentially and radially spaced arcuate slots arrayed in staggered relation about the brush seal segment. The pressure plate includes radially extending grooves opening toward the backing plate and intersecting each of the slots along that radius to afford a substantially uniform distribution of pressure on the downstream side of the bristle backing plate. In another embodiment, the grooves extend along the downstream faces of the bristle backing plate.

10 Claims, 4 Drawing Sheets

Figure 1:
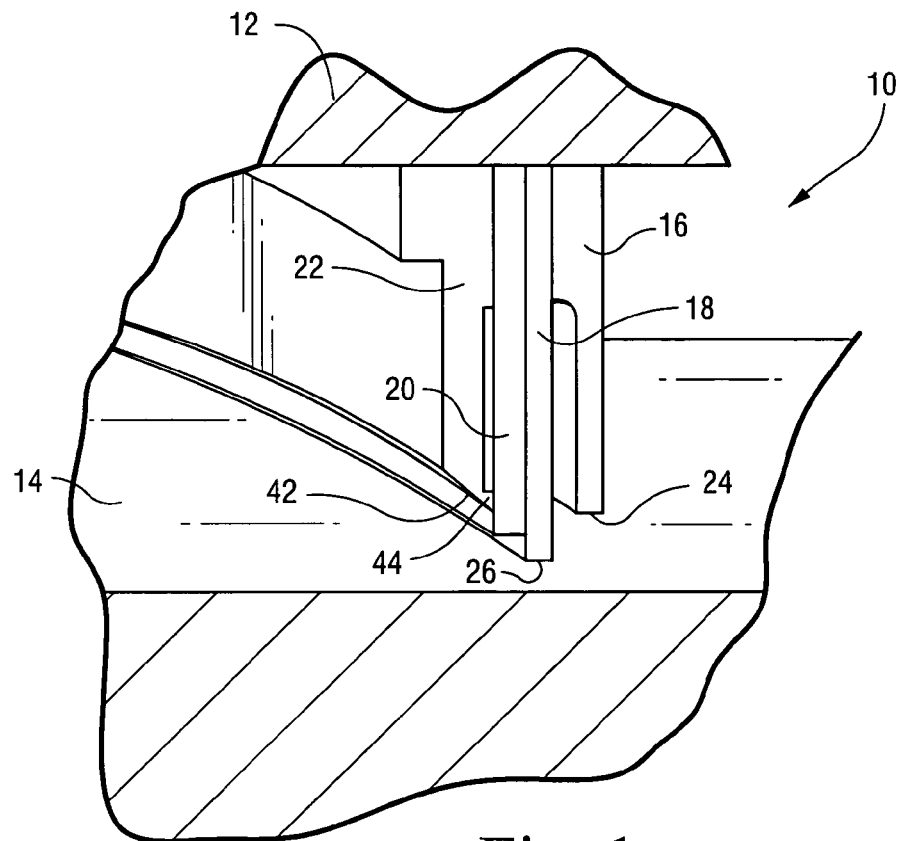
Figure 2:
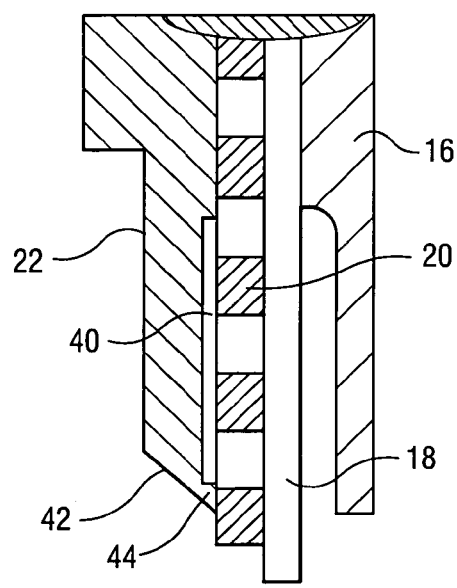

PRESSURE BALANCED BRUSH SEAL

BACKGROUND OF THE INVENTION

The present invention relates to brush seals between static and rotary components, sealing between high and low pressure regions and particularly relates to a balanced pressure brush seal for producing either a desired nonuniform or a substantially uniform pressure distribution on opposite sides of the bristle pack achieving an anti-hysterisis effect.

Typically, brush seals disposed between static and rotary components, for example between a packing and a rotary shaft or between a shroud and a bucket tip in a turbine include a bristle pack disposed between a fence on the high pressure side and a pressure plate on the low pressure side of the seal. The bristle pack normally includes a plurality of densely packed bristles fixed at one end adjacent the static component and cantilevered to extend substantially freely toward the rotor where the tips of the bristles engage the rotor. Typically, the bristles extend normally in the direction of rotation i.e. in the circumferential direction of rotation of the rotor forming an angle with the radius. The fence as well as the pressure plate have free ends which terminate short of the surface of the rotary component. Because of the pressure drop across the bristles, including the frictional engagements between the bristles and the pressure plate, and between layers of bristles, temporary excursions of the rotor, for example during turbine start up may permanently deflect or bend the bristles such that the tips no longer engage the rotor. Alternately, temporary rotor excursions may displace bristles radially away from the rotor with the seal under pressure whereby the bristle to bristle and bristle to pressure plate friction prohibits the bristles from returning to their position very close to the rotary component. This of course degrades the seal and has other deleterious effects on the wear life of the seal.

This phenomenon known as an anti-hysterisis effect, previously has been addressed. For example, in U.S. Pat. No. 5,799,952, a brush seal is provided having radially extending circumferentially spaced grooves formed in the pressure plate in an effort to obtain a balancing of the pressure on opposite sides of the bristle pack. In another known form of brush seal, a plurality of circumferentially extending grooves of varying width at discrete radial locations about the brush seal segment have been proposed and constructed in order to substantially balance the pressure on the opposite sides of the brush seals. It is also noted that suppliers of brush seal backing plate material, such as 409 stainless steel, have material availability problems as well as manufacturing difficulties in the formation of the brush seals. Accordingly, it has been found desirable to provide an improved pressure balanced brush seal which is readily and easily manufactured, provides substantially balanced pressure and which may be formed of more readily available materials.

SUMMARY OF PREFERRED EMBODIMENTS OF THE INVENTION

In a preferred embodiment of the present invention there is provided a circumferentially extending brush seal segment between static and rotary components having high and low pressure regions on opposite sides of the seal comprising: a fence carried by the static component and projecting toward the rotary component; a plurality of bristles forming a bristle pack carried by the static component on a downstream side of the fence and cantilevered toward the rotary component with tips of the bristles engaging the rotary component; a pressure plate carried by the static component on a downstream side of the bristle pack; a bristle pack backing plate carried by the static component between the bristle pack and the pressure plate; the bristle backing plate having a plurality of slots opening through opposite sides thereof, the pressure plate having a plurality of grooves formed on a side thereof facing the bristle backing plate, certain of said grooves lying in communication with selected slots of the bristle backing plate to provide a substantially uniform pressure distribution along a downstream side of the bristle pack.

In a further preferred embodiment of the present invention there is provided a circumferentially extending brush seal segment between static and rotary components having high and low pressure regions on opposite sides of the seal comprising: a fence carried by the static component and projecting toward the rotary component; a plurality of bristles forming a bristle pack carried by the static component on a downstream side of the fence and cantilevered toward the rotary component with tips of the bristles engaging the rotary component; a pressure plate carried by the static component on a downstream side of the bristle pack; a bristle pack backing plate carried by the static component between the bristle pack and the pressure plate; and the bristle backing plate having a plurality of slots opening through an upstream face thereof and a plurality of grooves formed on a downstream face thereof, the grooves lying in communication with selected slots of the bristle backing plate to provide a substantially uniform pressure distribution along a downstream side of the bristle pack.

BRIEF DESCRIPTION OF THE DRAWINGS

FIG. 1 is a fragmentary perspective view of a pressure balanced brush seal according to an aspect of the present invention disposed between a static and rotary component of a turbine.

FIG. 2 is an enlarged cross-sectional view of the brush seal;

FIG. 3 is a fragmentary enlarged elevational view of the bristle backing plate;

FIG. 4 is a cross-sectional view thereof taken generally about line 4-4 in FIG. 3;

FIG. 5 is a fragmentary enlarged elevational view of the pressure plate illustrating the grooves therein;

FIG. 6 is a cross-sectional view thereof taken generally about line 6-6 in FIG. 5;

FIG. 7 is a view similar to FIG. 3 illustrating a further embodiment of the bristle backing plate; and FIG. 8 is a cross-sectional view taken about on line 8-8 in FIG. 7.

DETAILED DESCRIPTION OF A PREFERRED EMBODIMENT

Referring to FIG. 1, there is illustrated a brush seal generally designated 10 disposed between static and rotary components 12 and 14, respectively, e.g. of a turbine. The rotary component may for example comprise a shaft 14 or the tips of buckets with the static component comprising a packing or a shroud 12 mounting the brush seal 10. As illustrated, the brush seal is mounted on opposite sides of high and low pressure regions. The brush seal 10 includes a fence 16, a plurality of bristles forming a bristle pack 18, a bristle backing plate 20 and a pressure plate 22. The fence 16, bristle pack 18, backing plate 20 and pressure plate 22 are joined one to the other and to the static component 12 in a known manner e.g. by welding. It will be appreciated that the brush seal 10 may be provided in arcuate segments about the axis of the rotary component 14, for example six segments of 60° each may be provided. Thus, the fence, bristle backing plate and the pressure plate are generally circumferentially coextensive with one another. The bristle pack is similarly coextensive except that the bristles angularly project from one end of the segment while the opposite end of the segment may include a pocket for receiving the projecting bristles of an adjacent brush seal segment.

As illustrated, the fence 16 extends radially inwardly from the static component 12 terminating in an edge 24 spaced radially from the rotary component 14 a distance typically to avoid interference with the rotor in the event of any rotary excursions of the rotor. The bristle pack may be formed of bristles in a conventional manner and extends from the static component or the weld at the proximal end of the brush seal toward the rotary component such that the tips 26 of the bristles engage the rotary component. The bristles, as is conventional, extend from the static component at an angle to a radius and typically in the rotary direction. The bristles may be formed of any known materials typically used in brush seals, for example see U.S. Pat. No. 5,474,306, the disclosure of which is incorporated by reference.

Figure 3:
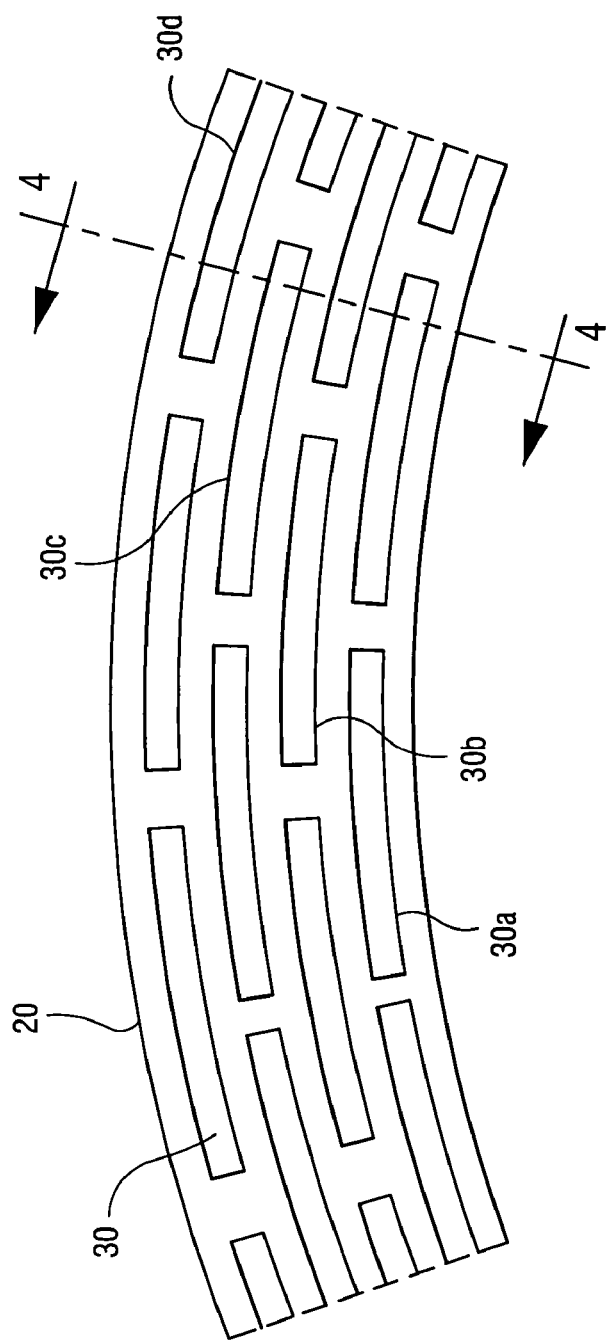
Figure 4:
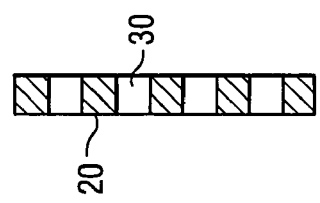

Located between the bristle pack 18 and the pressure plate 22 is a bristle backing plate 20. Plate 20, as illustrated in FIGS. 3 and 4, preferably includes a plurality of circumferentially extending slots 30 arranged in radially spaced rows. Each slot 30 extends through the bristle backing plate 20. The slots 30 also extend discontinuously in circumferential directions. Further, adjacent slots 30 are staggered relative to one another in a circumferential direction at each radial location relative to the adjacent radial location. For example, the first row of slots 30a at a radially innermost position has end portions in radial alignment with the second row of slots 30b radially outwardly of the first row. Similarly, the third row of slots 30c has end portions which are radially aligned respectively with end portions of adjacent slots of the second row of slots 30b as well as end of portions of circumferentially adjacent slots 30d in the outermost row of slots 30 in the bristle backing plate 20. It will be appreciated that additional or fewer circumferentially extending rows of slots may be formed in the bristle backing plate 20. Further, it will be seen in FIG. 3 that the slots 30a and 30c at opposite ends of the brush seal segment open toward and into the corresponding slots of the backing plates 20 of adjacent brush seal segments. In the preferred embodiment, any radial line passing through the backing plate 20 passes through at least two of the circumferentially extending slots 30 and, for large circumferentially portions of the plate 20 passes through the slots of all four rows of slots.

Figure 5:
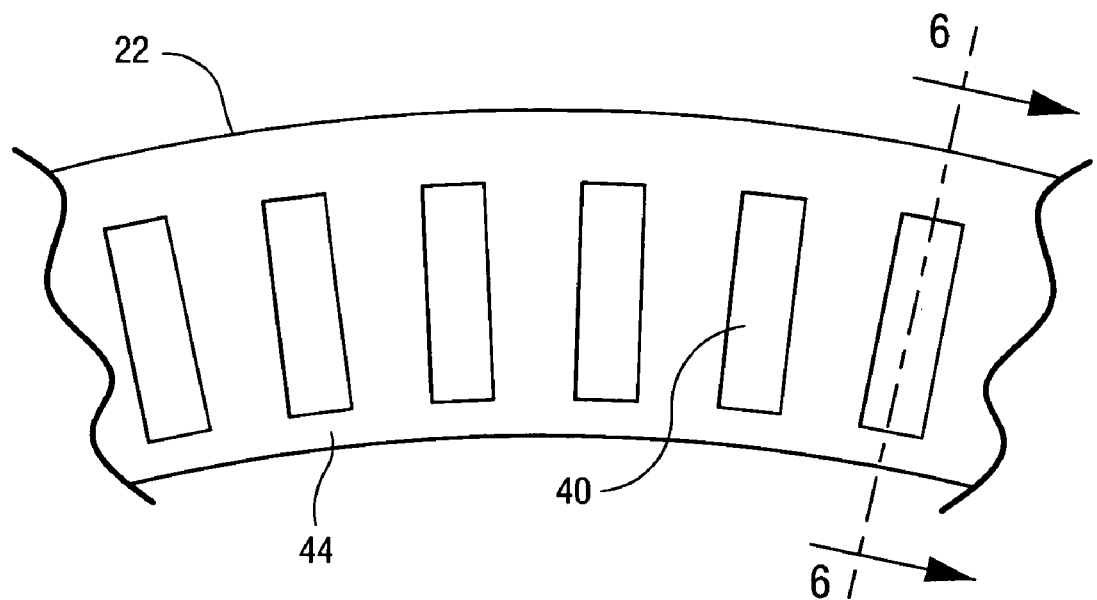
Figure 6:
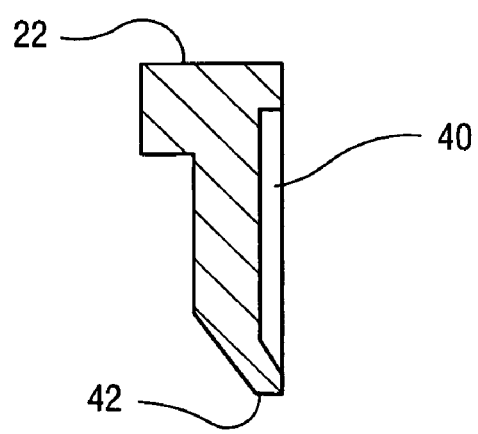

Referring to FIGS. 5 and 6, each pressure plate 22 includes a plurality of radially extending circumferentially spaced grooves 40 in each brush seal segment. Plate 22 is generally co-extensive with the brush seal segment and backing plate 20. Similarly as with fence 16, the pressure plate 22 extends from the static component terminating short of the rotating component 14 at an edge 42. The grooves 40 extend radially a distance short of edge 42 forming a flange 44 at the location of each groove and terminate adjacent the proximal end of the bristle pack 20.

Upon assembly, the pressure plate 22 and the bristle backing plate 20 are aligned with one another such that the grooves 40 open along a radial line intersecting each of the slots 30 along that radius. Thus, a uniform distribution of pressure along the backside of the bristle pack 20 is provided since the slots 30 communicate with one another through the grooves 40. Consequently, the pressure in the slots and grooves remain substantially uniform and balanced. To reduce costs and facilitate manufacture of the brush seal, the pressure plate 22 and the fence 16 are preferably formed of 430ss. The pressure plate and fence may be formed of other materials, such as 410ss or a variety of high temperature nickel based alloys. The bristle backing plate 20 is preferably formed of 409ss although 410ss may be used as well as other materials for locations opposite the buckets. The bristle backing plate 20 is thus formed of a softer material which does not score the rotary component should rubs occur. Also, the slots 30 may be formed in the plate 20 by laser or water jet which is efficient from a manufacturing standpoint. The principal advantages of using 430ss include a reduction in scrap material and lower distortion and residual stresses after machining in comparison with many of the 400ss series materials and may be inexpensively purchased in large quantities.

Figure 7:
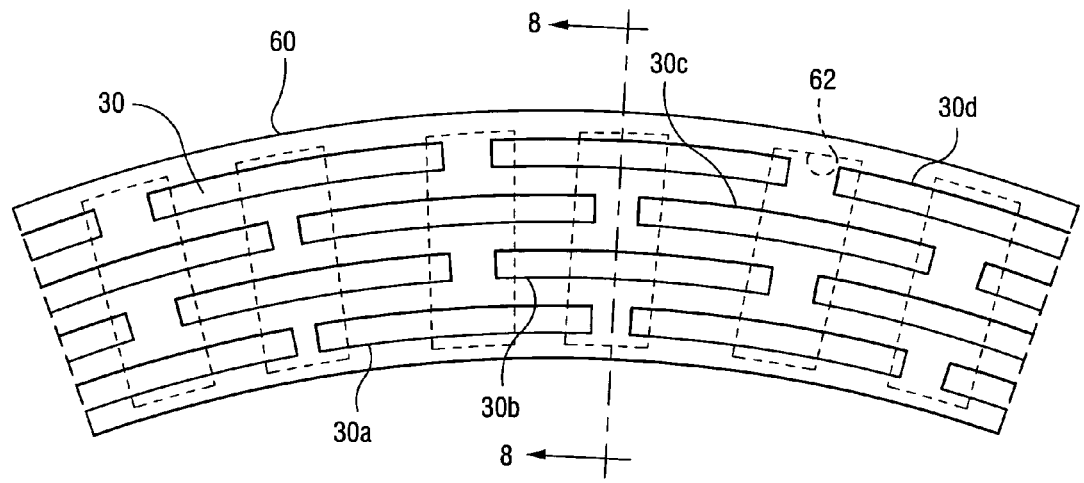
Figure 8:
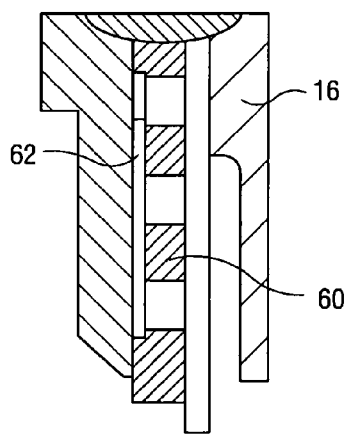

Referring now to the embodiment of FIGS. 7 and 8, there is illustrated a further embodiment of a bristle backing plate 60. Backing plate 60 includes the plurality of circumferentially extending slots 30 arranged in radially spaced rows similarly as in the embodiment illustrated in FIGS. 3 and 4. Thus, the slots 30 extend discontinuously in circumferential directions and through the backing plate 60. Slots 30 are also staggered relative to one another in the circumferential direction at each radial location relative to an adjacent radial location as previously described. In this embodiment, however, a plurality of connecting slots, grooves or recesses 62 are formed, preferably machined into the downstream or backside of the bristle back plate 60 instead of the upstream side of the pressure back plate 22 as in the previous embodiment. The slots, grooves or recesses 62 are circumferentially spaced one from the other and extend in a radial orientation. With this arrangement, the circumferentially extending slots 30 lie in communication with one another via the slots, grooves or recesses 62. This embodiment is beneficial where the brush assembly is inserted directly into a packing ring with an integrally machined pressure back plate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A circumferentially extending brush seal segment between static and rotary components having high and low pressure regions on opposite sides of the seal comprising:
   a fence carried by the static component and projecting toward the rotary component;
   a plurality of bristles forming a bristle pack carried by the static component on a downstream side of the fence and cantilevered toward the rotary component with tips of the bristles engaging the rotary component;
   a pressure plate carried by the static component on a downstream side of the bristle pack;
   a bristle pack backing plate carried by the static component between the bristle pack and the pressure plate;
   said bristle backing plate having a plurality of discontinuous, circumferentially extending and radially spaced slots opening through opposite sides thereof, said pressure plate having a plurality of grooves formed on a side thereof facing the bristle backing plate, certain of said grooves lying in communication with selected slots of said bristle backing plate to provide a substantially uniform pressure distribution along a downstream side of the bristle pack.

2. A seal segment according to claim 1, wherein said slots and said grooves in said bristle pack backing plate and said pressure plate respectively, are arranged in communication with one another to provide a substantially uniform pressure distribution along the downstream side of the bristle pack.

3. A seal segment according to claim 1, wherein the grooves terminate short of a flange formed on a radially inner tip of the pressure plate.

4. A seal segment according to claim 1, wherein said slots are staggered relative to one another in a circumferential direction at different radial locations along the bristle backing plate.

5. A seal segment according to claim 1, wherein the bristle pack backing plate is formed of 409 stainless steel.

6. A seal segment according to claim 1, wherein the pressure plate is formed of 430 stainless steel.

7. A seal segment according to claim 6, wherein the bristle pack backing plate is formed of 409 stainless steel.

8. A seal segment according to claim 7, wherein the fence is formed of 430 stainless steel.

9. A seal segment according to claim 1, wherein said slots along a given radius overlie at least one of said plurality of grooves along that radius.

10. A circumferentially extending brush seal segment between static and rotary components having high and low pressure regions on opposite sides of the seal comprising:

a fence carried by the static component and projecting toward the rotary component;

a plurality of bristles forming a bristle pack carried by the static component on a downstream side of the fence and cantilevered toward the rotary component with tips of the bristles engaging the rotary component;

a pressure plate carried by the static component on a downstream side of the bristle pack;

a bristle pack backing plate carried by the static component between the bristle pack and the pressure plate;

said bristle backing plate having a plurality of slots opening through opposite sides thereof, said pressure plate having a plurality of grooves formed on a side thereof facing the bristle backing plate, certain of said grooves lying in communication with selected slots of said bristle backing plate to provide a substantially uniform pressure distribution along a downstream side of the bristle pack;

wherein said slots along a given radius overlie at least one of said plurality of grooves along that radius; and wherein the slots are staggered relative to one another in a circumferential direction at different radial locations along the bristle pack backing plate.

* * * * *